United States Patent
Aruga (10) Patent No.: US 8,157,385 B2
(45) Date of Patent: Apr. 17, 2012

(54) REFLECTOR, LIGHT SOURCE APPARATUS, AND PROJECTOR

(75) Inventor: Susumu Aruga, Siojiri (JP)

(73) Assignee: Seiko Epson Corporation, Tokyo (JP)

( * ) Notice: Subject to any disclaimer, the term of this patent is extended or adjusted under 35 U.S.C. 154(b) by 458 days.

(21) Appl. No.: 12/350,551

(22) Filed: Jan. 8, 2009

(65) Prior Publication Data

US 2009/0190102 A1 Jul. 30, 2009

(30) Foreign Application Priority Data

Jan. 30, 2008 (JP) .................................. 2008-018650
Nov. 4, 2008 (JP) .................................. 2008-283111

(51) Int. Cl.
*F21V 7/00* (2006.01)
*G03B 21/28* (2006.01)
(52) U.S. Cl. ......................... 353/37; 353/98; 362/296.01
(58) Field of Classification Search .................... 353/37, 353/50, 98, 99; 362/296.01, 296.06, 297, 362/298, 301, 302, 310
See application file for complete search history.

(56) References Cited

U.S. PATENT DOCUMENTS

| | | | | |
|---|---|---|---|---|
| 4,320,442 A * | 3/1982 | McCamy | ...................... | 362/301 |
| 6,356,700 B1 * | 3/2002 | Strobl | ........................... | 385/147 |
| 6,540,381 B1 * | 4/2003 | Douglass, II | ........... | 362/311.09 |
| 7,513,654 B2 * | 4/2009 | Okada | ........................... | 362/297 |
| 7,559,675 B2 * | 7/2009 | Yamauchi et al. | ........... | 362/261 |
| 2006/0198139 A1 * | 9/2006 | Cheng | ........................... | 362/241 |
| 2009/0190102 A1 * | 7/2009 | Aruga | ........................... | 353/98 |

FOREIGN PATENT DOCUMENTS

| JP | A-2003-151302 | 5/2003 |
|---|---|---|
| JP | A-2006-092799 | 4/2006 |
| JP | A-2007-093989 | 4/2007 |

* cited by examiner

*Primary Examiner* — John Lee
(74) *Attorney, Agent, or Firm* — Oliff & Berridge, PLC (57) ABSTRACT

A reflector used in combination with a light emitting portion that emits light and disposed around a central axis on which the light emitting portion is disposed includes a curved reflection section having the substantially same shape as that of a surface of revolution around the central axis, the curved reflection section reflecting light from the light emitting portion, and a flat deflection section formed on a flat surface positioned closer to the central axis than the surface of revolution, the flat deflection section deflecting the light from the light emitting portion forward. The flat deflection section has a plurality of structural members formed on the flat surface.

12 Claims, 8 Drawing Sheets

REFLECTOR, LIGHT SOURCE APPARATUS, AND PROJECTOR

BACKGROUND

1. Technical Field

The present invention relates to a reflector, a light source apparatus, and a projector, and particularly to a technology of a reflector used in a light source apparatus of a projector.

2. Related Art

A projector is required to be reduced in thickness of the entire apparatus in order to improve mobility and installability. In a lamp used as a light source of a projector, for example, an ultrahigh-pressure mercury lamp or other discharge lamps, a reflector that reflects light emitted from a light emitting portion has been used. To efficiently direct the light toward an illuminated surface, the reflector is often shaped into a surface of revolution having a spheroidal shape, a paraboloidal shape, or other shapes. The reflector needs to be large enough to efficiently direct the light toward an illuminated surface. Therefore, among the components of an illumination system of a projector, a reflector is particularly problematic in many cases in reducing the thickness of the projector. A light source apparatus including a reflector is required to be not only capable of efficiently directing the light toward an illuminated surface but also small in thickness. For example, JP-A-2007-93989 has proposed a technology for reducing the thickness of a light source apparatus including a reflector. In the technology proposed in JP-A-2007-93989, use of a cylindrically-shaped reflector allows reduction in thickness of the light source apparatus. Providing a plurality of reflection surfaces formed along the circumferential direction of a tubular body on the inner surface of the reflector allows light to be focused at a position on the central axis.

The reflection surfaces that focus light at a position on the central axis are provided on the surface of a corrugated structure, for example, a structure having a Fresnel shape that forms a Fresnel lens. The structure having a Fresnel shape has a rearward-facing surface provided between adjacent reflection surfaces. The rearward-facing surfaces are formed along the circumferential direction of the tubular body, as in the case of the reflection surfaces. Part of the light emitted from a light emitting portion is incident on the rearward-facing surfaces directly from the light emitting portion or after reflected off the reflection surfaces. The light incident on the rearward-facing surfaces is directed in a direction different from the direction toward an illuminated surface. The technology of the related art therefore disadvantageously makes it difficult to efficiently direct the light toward the illuminated surface.

SUMMARY

An advantage of some aspects of the invention is to provide a thin reflector for efficiently directing light toward an illuminated surface, a light source apparatus using the reflector, and a projector.

A reflector according to an aspect of the invention is used in combination with a light emitting portion that emits light and disposed around a central axis on which the light emitting portion is disposed. The reflector includes a curved reflection section having the substantially same shape as that of a surface of revolution around the central axis, the curved reflection section reflecting light from the light emitting portion, and a flat deflection section formed on a substantially flat surface positioned closer to the central axis than the surface of revolution, the flat deflection section deflecting the light from the light emitting portion forward. The flat deflection section has a plurality of structural members formed on the flat surface.

The "forward" used herein is the side where an illuminated surface is located when viewed from the light emitting portion, and "deflect light forward" means deflecting light toward the side where the illuminated surface is located. The surface of revolution around the central axis is a curved surface obtained by rotating a predetermined curve around the central axis. The reflector can be reduced in thickness by providing the flat deflection section, as compared to a case where the reflector is only formed of the surface of revolution. When the light incident on the flat deflection section is not returned to the light emitting portion but directed forward, a loss that occurs when light returns to the light emitting portion, for example, a loss due to absorption and scattering in the lamp, is reduced, whereby the light is efficiently directed toward the illuminated surface. The flat deflection section can be configured to efficiently direct the light incident from the light emitting portion forward by not simply forming the flat deflection section with a flat reflection surface but providing a plurality of structural members on the flat deflection section. The curved reflection section having the substantially same shape as the surface of revolution efficiently directs the light toward the illuminated surface. A thin reflector that efficiently directs the light toward an illuminated surface is thus provided.

It is preferable that the flat deflection section is comprised of a first flat deflection section and a second flat deflection section provided on the opposite side of the central axis to the first flat deflection section. Employing a configuration in which the first flat deflection section and the second flat deflection section face each other allows the reflector to be thin.

It is preferable that the plurality of structural members form a diffraction grating that diffracts and hence deflects the light from the light emitting portion. Such a configuration allows the light incident on the flat deflection section to be efficiently directed toward an illuminated surface.

It is preferable that each of the plurality of structural members has a reflection surface that reflects and hence deflects the light from the light emitting portion. Such a configuration allows the light incident on the flat deflection section to be efficiently directed toward an illuminated surface.

It is preferable that the plurality of structural members form a blazed structure having a saw-tooth cross section. Such a configuration allows the light to be reflected and hence deflected.

It is preferable that the reflection surface has a curved surface based on a curve expressed in the cross section. Such a configuration allows the light to be more efficiently directed toward an illuminated surface.

It is preferable that the plurality of structural members form a Fresnel structure having the substantially same cross section as that of a Fresnel lens. Such a configuration allows the light to be more efficiently directed toward an illuminated surface.

It is preferable that each of the plurality of structural members is curved in the flat surface. Such a configuration allows the light to be directed toward the central axis.

It is preferable that the surface of revolution is a spheroidal surface obtained by rotating an ellipse around the central axis. Such a configuration allows the light to be efficiently directed toward the central axis.

It is preferable that when the ellipse is defined with reference to first and second focal points and the light emitting portion is disposed at the first focal point or in the vicinity of the first focal point, the plurality of structural members are substantially concentrically arranged around a position that corresponds to the second focal point or around the vicinity of the position that corresponds to the second focal point in the flat surface. Such a configuration allows the light to be more efficiently directed toward the central axis.

It is preferable that the surface of revolution is a paraboloidal surface obtained by rotating a parabola around the central axis. Such a configuration allows parallelized light to be efficiently directed toward an illuminated surface.

A light source apparatus according to another aspect of the invention includes a light emitting portion that emits light, and any of the reflectors described above. Use of any of the reflectors described above allows the light source apparatus to be thin and efficiently direct the light toward an illuminated surface. A thin light source apparatus capable of efficiently supplying light is thus provided.

A projector according to another aspect of the invention includes the light source apparatus described above and a spatial light modulator that modulates light outputted from the light source apparatus in accordance with an image signal. Use of the light source apparatus described above allows the projector to be thin and efficiently supply light. A thin projector capable of efficiently displaying a bright image is thus provided.

BRIEF DESCRIPTION OF THE DRAWINGS

The invention will now be described with reference to the accompanying drawings, wherein like numbers reference like elements.

DESCRIPTION OF EXEMPLARY EMBODIMENTS

Embodiments of the invention will be described below in detail with reference to the drawings.

First Embodiment

Figure 1:
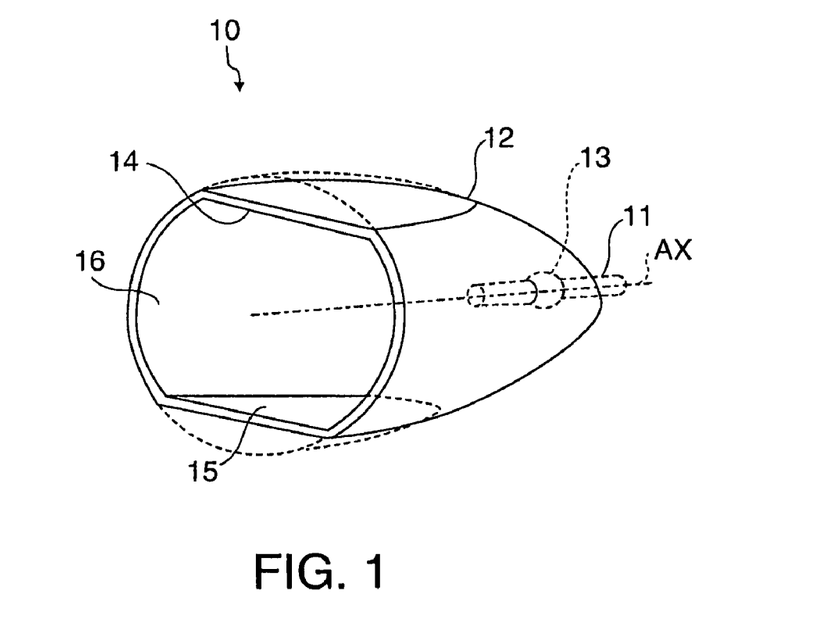
FIG. 1 shows a perspective configuration of a light source apparatus according to a first embodiment of the invention.

FIG. 1 shows a perspective configuration of a light source apparatus 10 according to a first embodiment of the invention. The light source apparatus 10 includes an arc tube 11 and a reflector 12. The arc tube 11 is, for example, an ultrahigh-pressure mercury lamp. The arc tube 11 has a light emitting portion 13 that emits light. It is assumed that the light emitting portion 13 is located on a central axis AX of the light source apparatus 10. The reflector 12 is provided around the central axis AX. The reflector 12 is formed into a concave shape having an opening on the side opposite the side where the arc tube 11 is provided.

The inner surface of the reflector 12 is comprised of a first flat deflection section 14, a second flat deflection section 15, and a curved reflection section 16. The first flat deflection section 14 is provided at part of the inner surface of the reflector 12, and that part is located on the opening side of the reflector 12. The second flat deflection section 15 is provided on the opposite side of the central axis AX to the first flat deflection section 14. The first flat deflection section 14 and the second flat deflection section 15 are substantially parallel to the central axis AX. The first flat deflection section 14 and the second flat deflection section 15 are shaped into flat surfaces having substantially the same size. Each of the first flat deflection section 14 and the second flat deflection section 15 is a flat deflection section that deflects the light from the light emitting portion 13 forward. The curved reflection section 16 is the portion of the inner surface of the reflector 12 other than the portion where the first flat deflection section 14 is provided and the portion where the second flat deflection section 15 is provided. The curved reflection section 16 has a curved shape. The curved reflection section 16 reflects the light from the light emitting portion 13.

Figure 2:
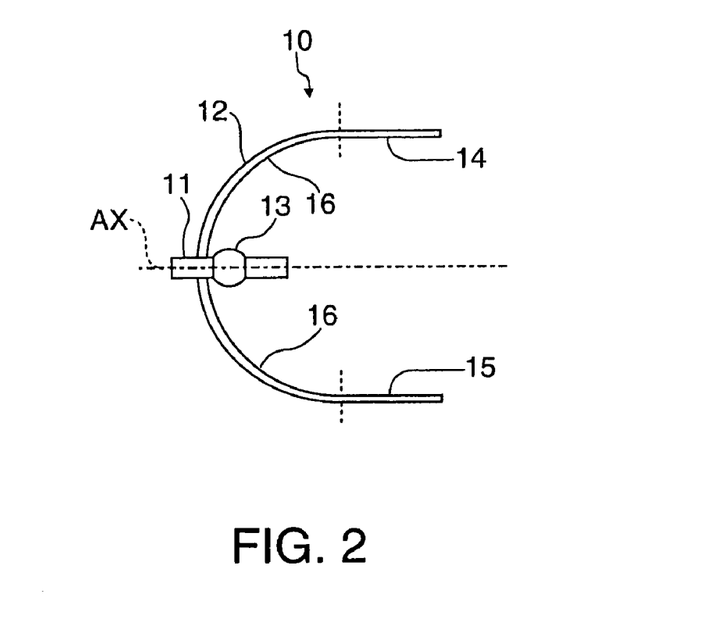
FIG. 2 shows a cross-sectional configuration of the light source apparatus taken along a plane including a central axis.

FIG. 2 shows a cross-sectional configuration of the light source apparatus 10, the cross-sectional configuration taken along a plane including the central axis AX and substantially perpendicular to the first flat deflection section 14 and the second flat deflection section 15. In the illustrated cross section, the curved reflection section 16 has the same shape as that of an ellipse whose major axis is the central axis AX. The curved reflection section 16 has the substantially same shape as that of a spheroidal surface obtained by rotating an ellipse around the central axis AX. The light emitting portion 13 is provided at a first focal point that is one of the focal points that define the ellipse. The first flat deflection section 14 and the second flat deflection section 15 are formed to be substantially parallel to each other.

Figure 3:
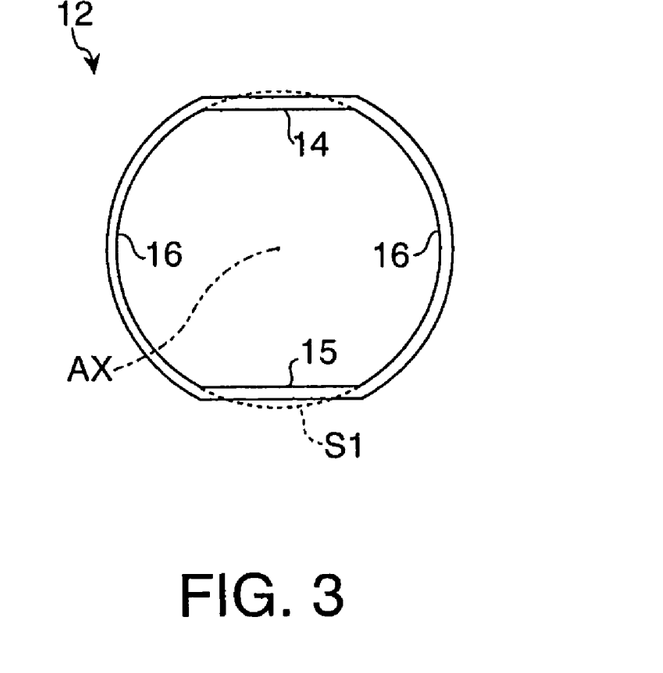
FIG. 3 shows a front configuration of a reflector in a plane perpendicular to the central axis.

FIG. 3 shows a front configuration of the reflector 12 in a plane perpendicular to the central axis AX. The configuration of the reflector 12 will be described based on a spheroidal surface S1 obtained by rotating an ellipse around the central axis AX. In the illustrated plane, the spheroidal surface S1 is expressed by a circle around the central axis AX. The curved reflection section 16 has the substantially same shape as that of the spheroidal surface S1. Each of the first flat deflection section 14 and the second flat deflection section 15 is formed on a flat surface located closer to the central axis AX than the spheroidal surface S1. Providing the first flat deflection section 14 and the second flat deflection section 15 facing each other allows the reflector 12 to be thinner than a case where the reflector 12 is only formed of the spheroidal surface S1. Further, when the optical axis of an optical system of the projector coincides with the central axis AX, the first flat deflection section 14 and the second flat deflection section 15 are substantially parallel to the optical axis of the optical system. An enclosure of the projector typically has upper and lower surfaces substantially parallel to the optical axis. Disposing the light source apparatus 10 in such a way that the first flat deflection section 14 and the second flat deflection section 15 are substantially parallel to the upper and lower surfaces allows the enclosure of the projector to be thin.

Figure 4:
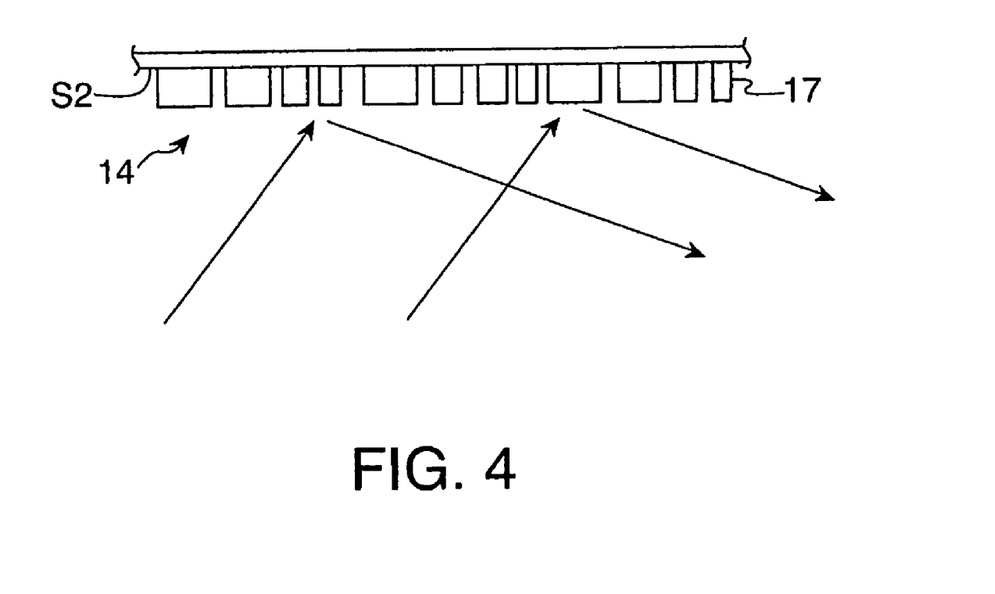
FIG. 4 diagrammatically shows a key-portion cross-sectional configuration of a first flat deflection section.

FIG. 4 diagrammatically shows a key-portion cross-sectional configuration of the portion of the reflector 12 where the first flat deflection section 14 is provided. The illustrated cross section is a plane including the central axis AX (not shown) and perpendicular to a flat surface S2 on which the first flat deflection section 14 is provided. The first flat deflection section 14 has a diffraction grating 17 provided on the flat surface S2. The diffraction grating 17 diffracts and hence deflects the light from the light emitting portion 13. The diffraction grating 17 has, for example, a minute binary structure. The minute binary structure is obtained by arranging a plurality of minute structural members having the substantially same height. Each of the structural members that form the diffraction grating 17 has a rectangular cross-sectional shape. The diffraction grating 17 is obtained by patterning as appropriate a substantially flat layer formed on the flat surface S2. The diffraction grating 17 is comprised of a dielectric multilayer film, a metallic film, or other high-reflectance members.

Figure 5:
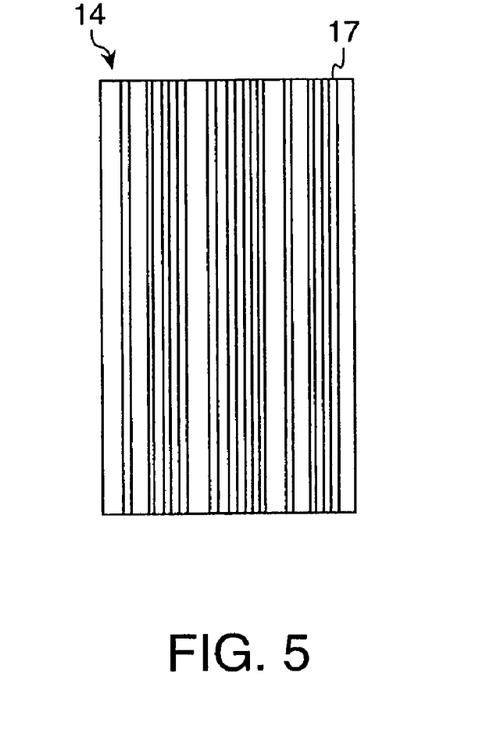
FIG. 5 diagrammatically shows a key-portion plan configuration of the first flat deflection section.

FIG. 5 diagrammatically shows a key-portion plan configuration of the first flat deflection section 14. The illustrated plane is a plane parallel to the flat surface S2 on which the first flat deflection section 14 is provided. The diffraction grating 17 is formed by arranging the structural members, which are formed to be substantially perpendicular to the central axis AX (not shown), in the direction along the central axis AX. The diffraction grating 17 changes the phase of light incident on each of the structural members. The diffraction grating 17 spatially changes the phase of light to produce diffracted light. Optimizing surface conditions including the interval between structural members that form the diffraction grating 17 and the height of the structural members allows the light incident from the light emitting portion 13 onto the first flat deflection section 14 to direct in a desired direction. The second flat deflection section 15 has another diffraction grating 17 formed in the same manner as the first flat deflection section 14.

Figure 6:
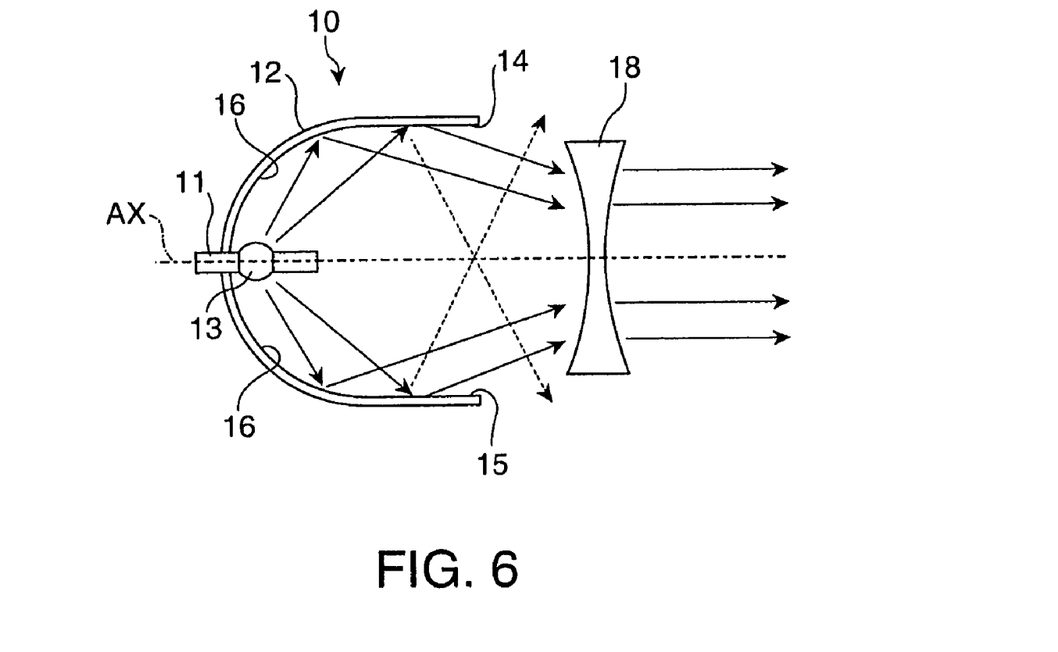
FIG. 6 explains the behavior of light emitted from a light emitting portion.

FIG. 6 explains the behavior of the light emitted from the light emitting portion 13. The following description will be made by assuming that the light outputted from the light source apparatus 10 is incident on a concave lens 18. The optical axis of the concave lens 18 substantially coincides with the central axis AX of the light source apparatus 10. The light emitted from the light emitting portion 13 radiates toward the entire inner surface of the reflector 12. The curved reflection section 16 directs the incident light forward when viewed from the light emitting portion 13, that is, toward the side where an illuminated surface is located when viewed from the light emitting portion 13. Specifically, the light originated from the first focal point of the ellipse and then reflected off the curved reflection section 16 is directed toward the second focal point of the ellipse. Providing the light emitting portion 13 at the first focal point allows the light to be efficiently directed from the curved reflection section 16 toward the second focal point on the central axis AX.

The diffraction grating 17 (see FIGS. 4 and 5) formed on each of the first flat deflection section 14 and the second flat deflection section 15 is formed in such a way that the incident light is diffracted and directed forward when viewed from the light emitting portion 13, that is, toward the side where an illuminated surface is located when viewed from the light emitting portion 13. The light emitted from the light emitting portion 13 and incident on the first flat deflection section 14 is deflected by the first flat deflection section 14 and directed forward. The light emitted from the light emitting portion 13 and incident on the second flat deflection section 15 is deflected by the second flat deflection section 15 and directed forward. The first flat deflection section 14 and the second flat deflection section 15 preferably diffract the incident light in the diffraction grating 17, and hence deflect the diffracted light toward the second focal point on the central axis AX. If each of the first flat deflection section 14 and the second flat deflection section 15 is replaced with a simple flat reflection surface, a large proportion of light is not incident on the concave lens 18 and hence wasted, as indicated by the broken lines in FIG. 6. The light source apparatus 10 of the present embodiment uses the first flat deflection section 14 and the second flat deflection section 15 to efficiently deflect the light in a desired direction. Further, employing a configuration in which the light incident on the first flat deflection section 14 and the second flat deflection section 15 is not returned to the light emitting portion 13 but directed forward reduces a loss that occurs when the light returns to the light emitting portion 13, for example, a loss due to absorption and scattering in the arc tube 11, whereby the light is efficiently directed toward an illuminated surface.

The concave lens 18 parallelizes the light directed from the light source apparatus 10 toward the second focal point. The reflector 12, which is comprised of the curved reflection section 16, the first flat deflection section 14, and the second flat deflection section 15, can efficiently direct the light toward the second focal point, whereby the concave lens 18 can efficiently direct the light toward an illuminated surface (not shown). Such a configuration is advantageous in that the reflector 12 can be thin and efficiently direct the light toward an illuminated surface.

The curved reflection section 16 is obtained by depositing a dielectric multilayer film, a metallic member, or other high-reflectance members on a surface of a substrate formed into a desired shape. Other components of the reflector 12, the first flat deflection section 14 and the second flat deflection section 15, are obtained by forming the diffraction grating 17 on a surface of a substrate having a flat-plate shape. An example of the substrates on which the curved reflection section 16, the first flat deflection section 14, and the second flat deflection section 15 are formed may be a heat-resistant glass. The reflector 12 can be manufactured by combining the substrate on which the curved reflection section 16 is formed, the substrate on which the first flat deflection section 14 is formed, and the substrate on which the second flat deflection section 15 is formed. Each of the first flat deflection section 14 and the second flat deflection section 15 is not limited to a component that deflects light toward the second focal point of an ellipse, but may be any component that deflects light at least forward.

Second Embodiment

Figure 7:
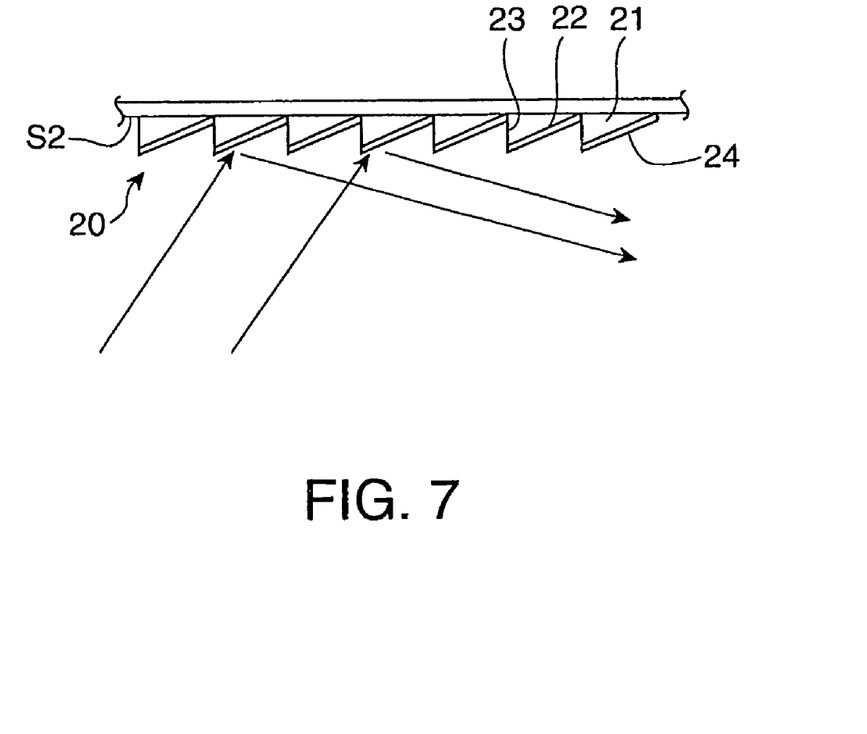
FIG. 7 shows a key-portion cross-sectional configuration of a first flat deflection section of a reflector according to a second embodiment of the invention.

FIG. 7 shows a key-portion cross-sectional configuration of the portion of a reflector according to a second embodiment of the invention on which a first flat deflection section 20 is provided. The illustrated cross section includes the central axis AX (not shown) and is perpendicular to a flat surface S2 on which the first flat deflection section 20 is provided. A second flat deflection section (not shown) has the same configuration as that of the first flat deflection section 20. The portion of the reflector of the present embodiment other than the first flat deflection section 20 and the second flat deflection section has the same configuration as that of the reflector 12 of the first embodiment described above. The same portions as those in the first embodiment have the same reference characters and redundant description thereof will be omitted.

The first flat deflection section 20 has a blazed structure 21 provided on the flat surface S2. The blazed structure 21 has a saw-tooth cross section. The blazed structure 21 is formed by arranging a plurality of minute structural members, each of which having a triangular cross section. Each of the minute structural members that form the blazed structure 21 has a first surface 22 and a second surface 23. The blazed structure 21 is formed by arranging the structural members, which are formed substantially perpendicular to the central axis AX (not shown), in the direction along the central axis AX, as in the case of the diffraction grating 17 (see FIG. 5) in the first embodiment. The blazed structure 21 is obtained by patterning as appropriate a substantially flat layer formed on the flat surface S2.

A reflection surface 24 is formed on each of the first surfaces 22 of the blazed structure 21. The first surface 22 is inclined to the flat surface S2. The second surface 23 is formed between first surfaces 22. Each of the first surface 22 and the second surface 23 is a substantially flat surface. The reflection surface 24 reflects and hence deflects the light from the light emitting portion 13 (see FIG. 2). The first surface 22 is inclined in such a way that the far side of the first surface 22, when viewed from the opening of the reflector, is further apart from the flat surface S2 than the near side of the first surface 22. Therefore, the reflection surface 24 is formed to reflect and direct the incident light forward when viewed from the light emitting portion 13, that is, toward the side where an illuminated surface is located when viewed from the light emitting portion 13. The reflection surface 24 can be formed by depositing a dielectric multilayer film, a metallic film, or other high-reflectance members on each of the first surfaces 22 of the blazed structure 21. The light emitted from the light emitting portion 13 and incident on the first flat deflection section 20 is deflected by the first flat deflection section 20 and directed forward. The first flat deflection section 20 and the second flat deflection section preferably reflect the incident light off the reflection surfaces 24, and hence deflect the reflected light toward the second focal point on the central axis AX (see FIG. 1). In the present embodiment as well, the reflector can be thin and efficiently direct the light toward an illuminated surface.

Figure 8:
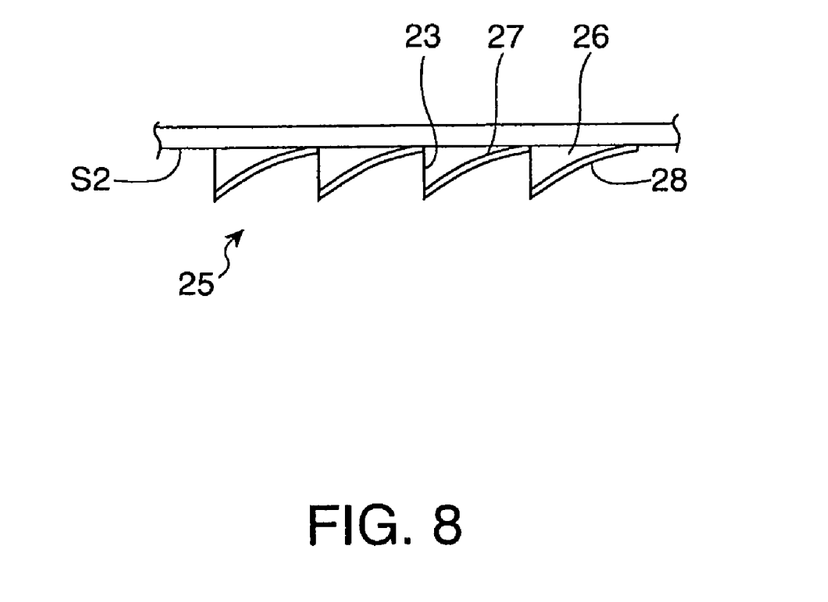
FIG. 8 shows a key-portion cross-sectional configuration of a first flat deflection section according to a first variation of the second embodiment.

FIG. 8 shows a key-portion cross-sectional configuration of the portion of a reflector according to a first variation of the present embodiment on which a first flat deflection section 25 is provided. A blazed structural member 26 that forms the first flat deflection section 25 has a concave first surface 27. A reflection surface 28 is formed on the first surface 27 of the blazed structural member 26. The reflection surface 28 is a curved surface based on a curve expressed in the illustrated cross section. The illustrated cross section is a surface including the central axis AX (not shown) and perpendicular to a flat surface S2 on which the first flat deflection section 25 is provided. The shape of the first surface 27 can be determined as appropriate so that the light is efficiently directed forward, preferably toward the second focal point on the central axis AX.

Figure 9:
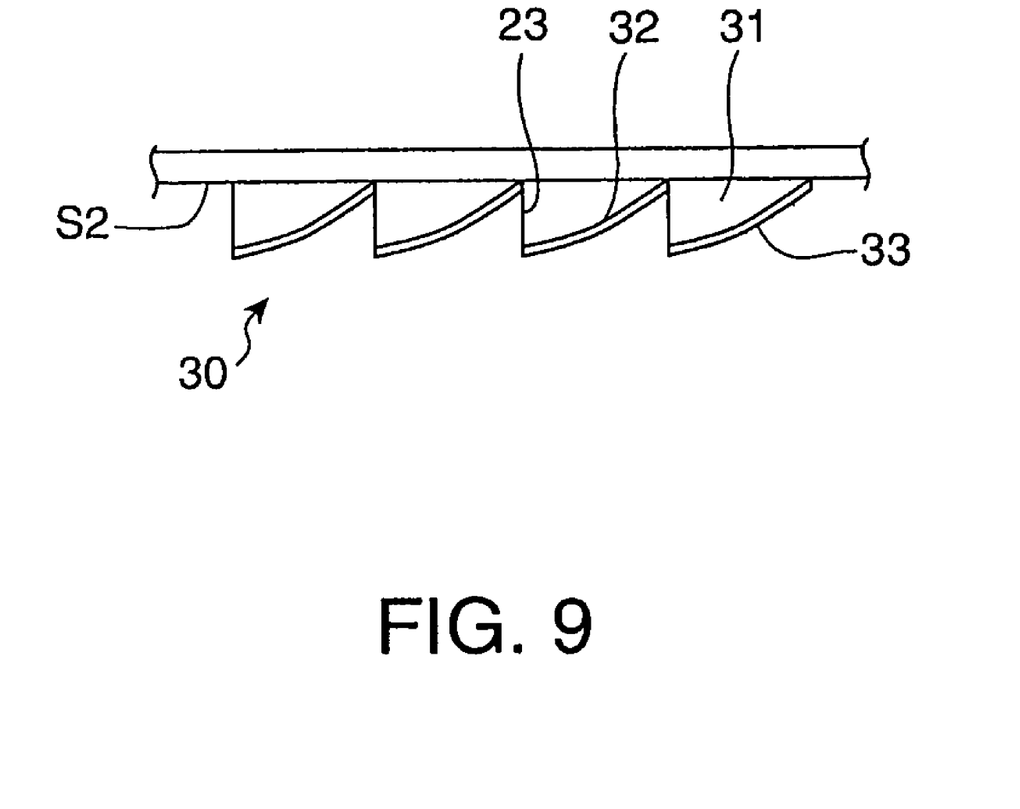
FIG. 9 shows a key-portion cross-sectional configuration of a first flat deflection section according to a second variation of the second embodiment.

FIG. 9 shows a key-portion cross-sectional configuration of the portion of a reflector according to a second variation of the present embodiment on which a first flat deflection section 30 is provided. A blazed structural member 31 that forms the first flat deflection section 30 has a convex first surface 32. A reflection surface 33 is formed on the first surface 32 of the blazed structural member 31. The reflection surface 33 is a curved surface based on a curve expressed in the illustrated cross section. The illustrated cross section is a surface including the central axis AX (not shown) and perpendicular to a flat surface S2 on which the first flat deflection section 30 is provided. The shape of the first surface 32 can be determined as appropriate so that the light is efficiently directed forward, preferably toward the second focal point on the central axis AX. Deforming the reflection surfaces 28, 33 as appropriate, as described with reference to FIGS. 8 and 9, allows the light to be more efficiently directed toward an illuminated surface. Each of the first surface 27 in the first variation and the first surface 32 in the second variation is not necessarily comprised of only a curved surface, but may be comprised of, for example, a plurality of flat surfaces or a combination of curved surfaces and flat surfaces. In any of the blazed structures described in the present embodiment, the pitch at which the structural members are arranged, and the shape of each of the structural members, for example, the inclination and curvature of the first surface are not necessarily fixed values, but the above parameters may be changed as appropriate in consideration of the efficiency at which the light is directed toward an illuminated surface.

Figure 10A:
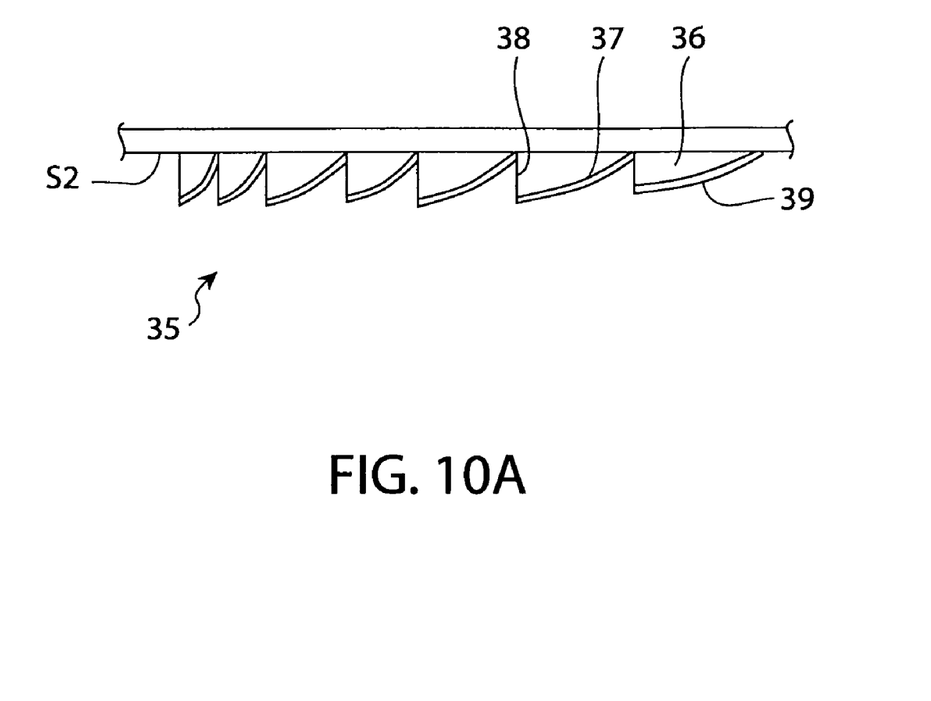
FIG. 10A shows a key-portion cross-sectional configuration of a first flat deflection section according to a third variation of the second embodiment.

FIG. 10A shows a key-portion cross-sectional configuration of the portion of a reflector according to a third variation of the present embodiment on which a first flat deflection section 35 is provided. The illustrated cross section includes the central axis AX (not shown) and is perpendicular to a flat surface S2 on which the first flat deflection section 35 is provided. The first flat deflection section 35 has a Fresnel structure 36 provided on the flat surface S2. The Fresnel structure 36 is formed by arranging a plurality of minute structural members, each of which having the substantially same cross-sectional shape as that of a cut portion obtained by annularly cutting the convex surface of a convex lens. The Fresnel structure 36 has the substantially same cross-sectional shape as that of a Fresnel lens. It is noted that the cross section of a Fresnel lens is a cross section cut along a plane including the diameter of the lens, whereas the cross section of the Fresnel structure 36 is a cross section cut along a plane including the central axis X and perpendicular to the flat surface S2.

Each of the minute structural members that form the Fresnel structure 36 has a first surface 37 and a second surface 38. The first surface 37 is a convex curved surface. A reflection surface 39 is formed on each of the first surfaces 37 of the Fresnel structure 36. The reflection surface 39 is a curved surface based on a curve expressed in the illustrated cross section. The reflection surface 39 can be formed by depositing a dielectric multilayer film, a metallic film, or other high-reflectance members on the first surface 37 of the Fresnel structure 36. The light emitted from the light emitting portion 13 (see FIG. 2) and incident on the first flat deflection section 35 is deflected by the first flat deflection section 35 and directed forward. The first flat deflection section 35 and the second flat deflection section preferably reflect the incident light off the reflection surfaces 39, and hence deflect the reflected light toward the second focal point on the central axis AX. In the present variation as well, the reflector can be thin and efficiently direct the light toward an illuminated surface. The Fresnel structure 36, which is comprised of the first surface 37 and the second surface 38, may be differently configured as long as the first surface 37, on which the reflection surface 39 is formed, follows the cross-sectional shape of a Fresnel lens.

Figure 10B:
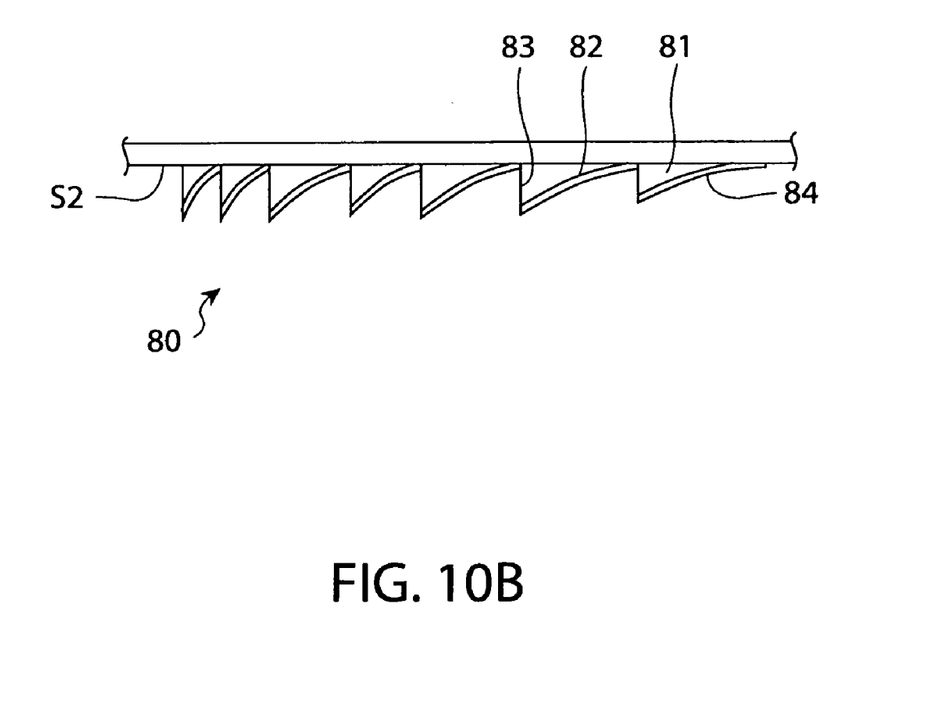
FIG. 10B shows a key-portion cross-sectional configuration of a first flat deflection section according to a fourth variation of the second embodiment.

FIG. 10B shows a key-portion cross-sectional configuration of the portion of a reflector according to a fourth variation of the present embodiment on which a first flat deflection section 80 is provided. The illustrated cross section includes the central axis AX (not shown) and is perpendicular to a flat surface S2 on which the first flat deflection section 80 is provided. A Fresnel structure 81 formed on the first flat deflection section 80 is formed by arranging a plurality of minute structural members, each of which having the substantially same cross-sectional shape as that of a cut portion obtained by annularly cutting the spheroidal surface S1 of the curved reflection section 16 (see FIG. 3). Each of the cross section of the curved reflection section 16 and the cross section of the Fresnel structure 81 is a cross section cut along a plane including the central axis X and perpendicular to the flat surface S2.

Each of the minute structural members that form the Fresnel structure 81 has a first surface 82 and a second surface 83. The first surface 82 is a concave curved surface. A reflection surface 84 is formed on each of the first surfaces 82 of the Fresnel structure 81. The light emitted from the light emitting portion 13 (see FIG. 2) and incident on the first flat deflection section 80 is deflected by the first flat deflection section 80 and directed forward. The first flat deflection section 80 and the second flat deflection section preferably reflect the incident light off the reflection surfaces 84, and hence deflect the reflected light toward the second focal point on the central axis AX. In the present variation as well, the reflector can be thin and efficiently direct the light toward an illuminated surface. When the first surface 82 is a concave curved surface, improving the focusability of the light reflected off the reflection surfaces 84 allows the light to be efficiently directed toward the second focal point. The Fresnel structure 81, which is comprised of the first surface 82 and the second surface 83, may be differently configured as long as the first surface 82, on which the reflection surface 84 is formed, follows the cross-sectional shape of the spheroidal surface S1 of the curved reflection section 16.

When the cut portions obtained by annularly cutting the spheroidal surface S1 are displaced in parallel and arranged on the flat surface S2, the focal point position of each of the cut portions deviates from the focal point position of the original spheroidal surface S1. The Fresnel structure 81 is therefore desirably configured in such a way that not only are the cut portions obtained by annularly cutting the spheroidal surface S1 simply arranged, but also the shapes of the cut portions are adjusted as appropriate to correct the deviations in focal point position. For example, adjusting the curvature of each of the first surfaces 82 with respect to the original spheroidal surface S1 as appropriate allows the light to be efficiently directed in a desired direction, specifically toward the second focal point.

The Fresnel structure 81 may be configured in such a way that the concave first surface 82 described in the present variation is reversed into a convex curved surface. When the first surface is a convex curved surface, improving divergency of light allows the light to travel farther.

Figure 11:
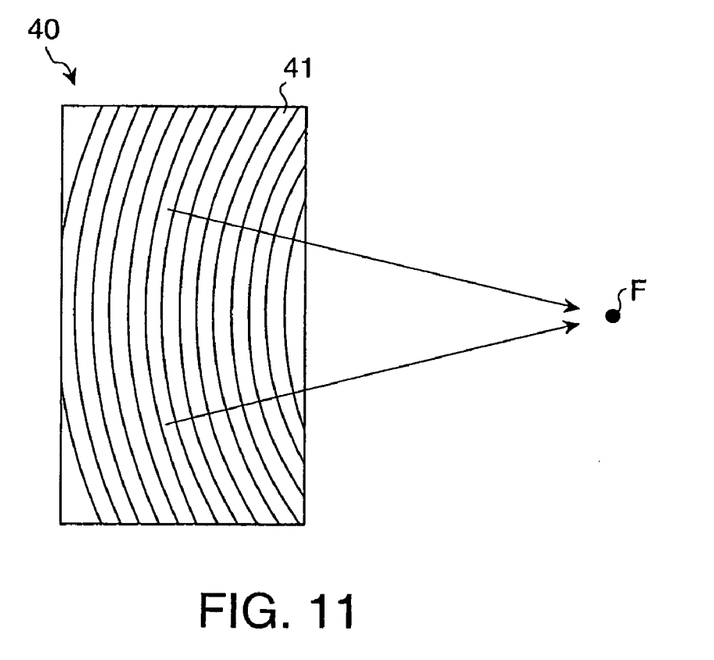
FIG. 11 diagrammatically shows a first flat deflection section according to a fifth variation of the second embodiment.

FIG. 11 diagrammatically shows a key-portion plan configuration of a first flat deflection section 40 of a reflector according to a fifth variation of the present embodiment. The illustrated plane is parallel to a flat surface S2 on which the first flat deflection section 40 is provided. A second flat deflection section (not shown) has the same configuration as that of the first flat deflection section 40. A blazed structure 41 that forms the first flat deflection section 40 has a curved shape in the illustrated plane. The blazed structure 41 is concentrically arranged around a predetermined position F that corresponds to the second focal point. The position F is obtained by projecting the second focal point S2 of the ellipse that defines the curved reflection section 16 (see FIG. 2) of the reflector onto the flat surface S2.

The first flat deflection section 40 can direct the light toward the second focal point on the central axis AX not only in a plane perpendicular to the flat surface S2 but also in a plane parallel to the flat surface S2. The light can thus be more efficiently directed toward an illuminated surface. As in the case where the blazed structure 41 is used, the Fresnel structure 36 described above (see FIG. 10A) may also be concentrically arranged around the position F.

Third Embodiment

Figure 12:
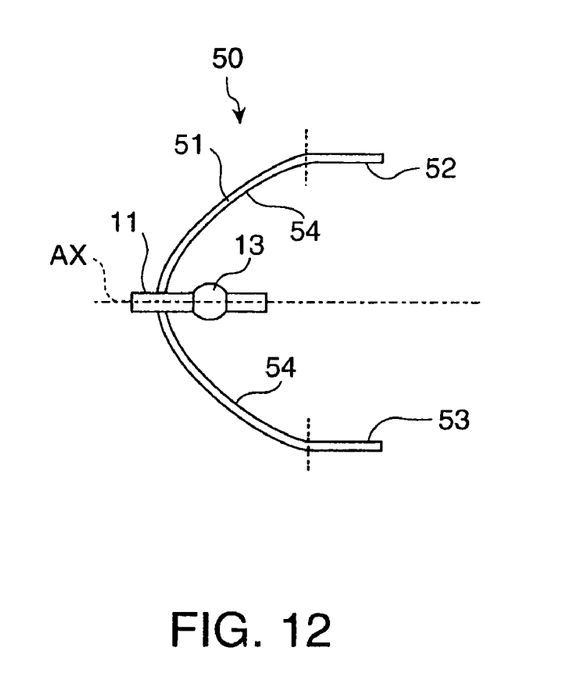
FIG. 12 shows a cross-sectional configuration of a light source apparatus according to a third embodiment of the invention.

FIG. 12 shows a cross-sectional configuration of a light source apparatus 50 according to a third embodiment of the invention. The illustrated cross section is a plane including the central axis AX and substantially perpendicular to a first flat deflection section 52 and a second flat deflection section 53. The same portions as those in the first embodiment have the same reference characters and redundant description thereof will be omitted. The light source apparatus 50 has an arc tube 11 and a reflector 51. The reflector 51 is provided around the central axis AX. The reflector 51 is formed into a concave shape having an opening on the side opposite the side where the arc tube 11 is provided.

The inner surface of the reflector 51 is comprised of the first flat deflection section 52, the second flat deflection section 53, and a curved reflection section 54. The first flat deflection section 52 is provided at part of the inner surface of the reflector 51, and that part is located on the opening side of the reflector 51. The second flat deflection section 53 is provided on the opposite side of the central axis AX to the first flat deflection section 52. The first flat deflection section 52 and the second flat deflection section 53 are substantially parallel to the central axis AX. Each of the first flat deflection section 52 and the second flat deflection section 53 is a flat deflection section that deflects the light from the light emitting portion 13 forward. Each of the first flat deflection section 52 and the second flat deflection section 53 has a diffraction grating (not shown) that diffracts and hence deflects the light from the light emitting portion 13. Each of the first flat deflection section 52 and the second flat deflection section 53 can be configured in the same manner as the first flat deflection section 14 in the first embodiment.

The curved reflection section 54 is the portion of the inner surface of the reflector 51 other than the portion where the first flat deflection section 52 is provided and the portion where the second flat deflection section 53 is provided. The curved reflection section 54 has a curved shape. The curved reflection section 54 reflects the light from the light emitting portion 13. In the illustrated cross section, the curved reflection section 54 has the substantially same shape as that of a parabola whose symmetrical axis is the central axis AX. The curved reflection section 54 has the substantially same shape as that of a paraboloidal surface obtained by rotating a parabola around the central axis AX. The light emitting portion 13 is provided at the focal point that defines the parabola.

The configuration of the reflector 51 will be described based on a paraboloidal surface obtained by rotating a parabola around the central axis AX. In a plane perpendicular to the central axis AX, the paraboloidal surface is expressed by a circle around the central axis AX, as in the case of the spheroidal surface S1 shown in FIG. 3. The curved reflection section 54 has the substantially same shape as that of part of the paraboloidal surface. Each of the first flat deflection section 52 and the second flat deflection section 53 is formed on a flat surface located closer to the central axis AX than the portion of the paraboloidal surface other than the portion where the curved reflection section 54 is provided. Providing the first flat deflection section 52 and the second flat deflection section 53 facing each other allows the reflector 51 to be thinner than a case where the reflector 51 only has the shape substantially the same as that of a paraboloidal surface.

Figure 13:
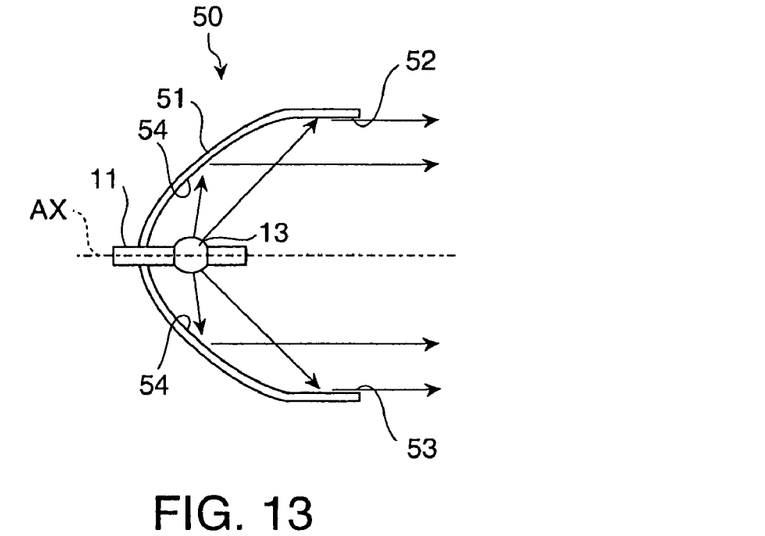
FIG. 13 explains the behavior of light emitted from a light emitting portion.

FIG. 13 explains the behavior of the light emitted from the light emitting portion 13. The light originated from the focal point of the parabola and then reflected off the curved reflection section 54 travels substantially parallel to the central axis AX. Providing the light emitting portion 13 at the focal point allows the light to be efficiently directed from the curved reflection section 54 toward an illuminated surface (not shown). The light emitted from the light emitting portion 13 and incident on the first flat deflection section 52 is deflected by the first flat deflection section 52 and directed substantially parallel to the central axis AX. The light emitted from the light emitting portion 13 and incident on the second flat deflection section 53 is deflected by the second flat deflection section 53 and directed substantially parallel to the central axis AX.

The reflector 51, which is comprised of the curved reflection section 54, the first flat deflection section 52, and the second flat deflection section 53, can efficiently direct the light toward an illuminated surface. Therefore, in the present embodiment as well, the reflector 51 can be thin and efficiently direct the light toward an illuminated surface. The light source apparatus 50 of the present embodiment uses no concave lens but can direct light substantially parallel to the central axis AX. The light source apparatus 50 is thus advantageous in that the number of parts is fewer than that of the light source apparatus 10 according to the first embodiment. On the other hand, the reflector 12 of the first embodiment having a spheroidal surface is advantageous in that the reflector 12 can be more readily thin than the reflector 51 of the present embodiment having a paraboloidal surface. In the present embodiment as well, each of the first flat deflection section 52 and the second frat deflection section 53 does not necessarily have a diffraction grating, but may have reflection surfaces provided on a blazed structure or a Fresnel structure.

Each of the reflectors described in the above embodiments have the first and second flat deflection sections, but the reflector does not necessarily have the two deflection sections. The reflector may be differently configured as long as it has at least one flat deflection section. Using at least one flat deflection section is advantageous in that the reflector is thinner than in a case where the reflector only has the substantially same shape as a spheroidal surface or a paraboloidal surface. The curved reflection section does not necessarily have the substantially same shape as part of a spheroidal surface or part of a paraboloidal surface, but may have the substantially same shape as part of any other surface of revolution obtained by rotating a predetermined curve around the central axis AX. Further, the curved reflection section may have a free-form surface obtained by deforming a surface of revolution.

The arc tube 11 used in the light source apparatus in each of the above embodiments is not limited to an ultrahigh-pressure mercury lamp, but may be a metal halide lamp, a halogen lamp, a xenon lamp, or other lamps. The light source apparatus does not necessarily have a lamp, but may be configured to use a light emitting diode (LED), a super-luminescence diode (SLD), or other solid-state light sources.

Fourth Embodiment

Figure 14:
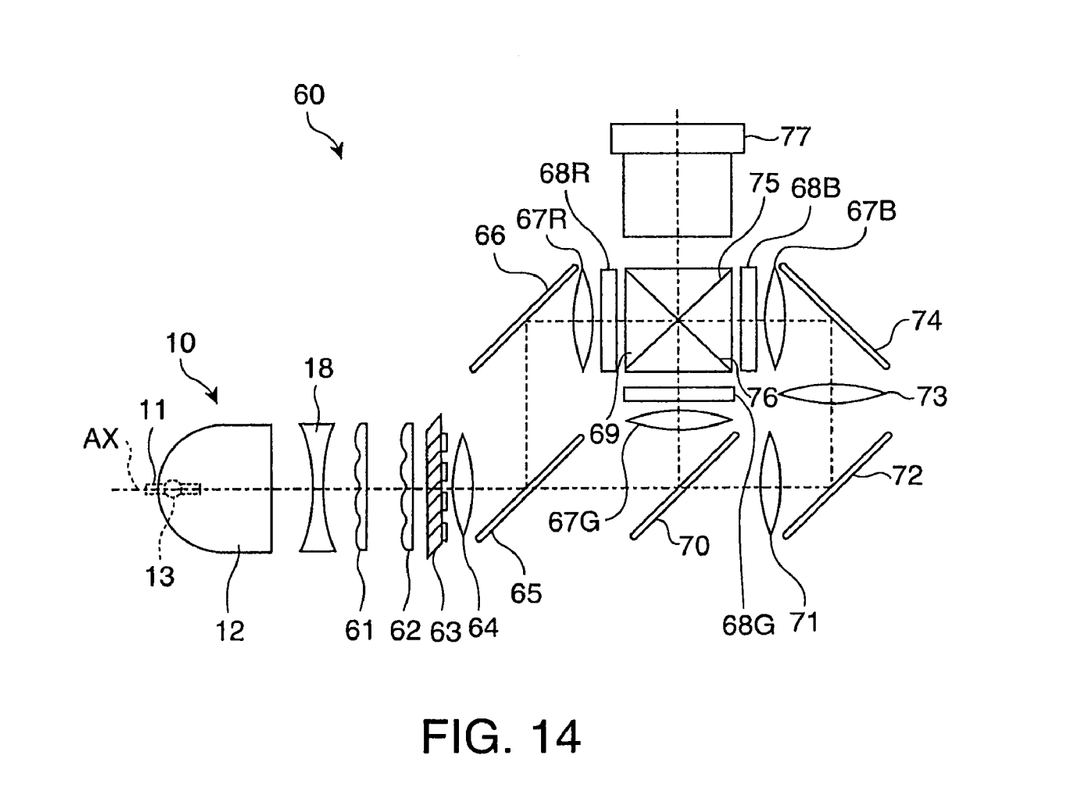
FIG. 14 shows a schematic configuration of a projector according to a fourth embodiment of the invention.

FIG. 14 shows a schematic configuration of a projector 60 according to a fourth embodiment of the invention. The projector 60 is a front-projection projector, which projects light onto a screen (not shown) and presents an image to a viewer who observes the light reflected off the screen. The projector 60 includes the light source apparatus 10 according to the first embodiment described above. The light source apparatus 10 outputs light containing red (R) light, green (G) light, and blue (B) light. A concave lens 18 parallelizes the light outputted from the light source apparatus 10. Each of a first integration lens 61 and a second integration lens 62 includes a plurality of lens elements arranged in an array. The first integration lens 61 divides the light flux from the concave lens 18 into a plurality of sub-fluxes. The lens elements in the first integration lens 61 focus the light flux from the concave lens 18 in the vicinity of the respective lens elements in the second integration lens 62. The lens elements in the second integration lens 62 form images of the lens elements in the first integration lens 61 on spatial light modulators.

The light that has passes through the two integration lenses 61 and 62 is converted by a polarization conversion element 63 into linearly polarized light having a specific oscillation direction. A superimposing lens 64 superimposes the images of the lens elements in the first integration lens 61 on the spatial light modulators. The first integration lens 61, the second integration lens 62, and the superimposing lens 64 make the intensity distribution of the light from the light source apparatus 10 uniform on the spatial light modulators. The light through the superimposing lens 64 is incident on a first dichroic mirror 65. The first dichroic mirror 65 reflects the R light and transmits the G and B light. The R light incident on the first dichroic mirror 65 is reflected off the first dichroic mirror 65 and a reflection mirror 66, so that the optical path is folded, and the reflected light is incident on a field lens for R light 67R. The field lens for R light 67R parallelizes the R light from the reflection mirror 66, and the parallelized light is incident on a spatial light modulator for R light 68R.

The spatial light modulator for R light 68R modulates the R light in accordance with an image signal. Specifically, the spatial light modulator for R light 68R is a transmissive liquid crystal display device. A liquid crystal panel (not shown) provided in the spatial light modulator for R light 68R encapsulates a liquid crystal layer for modulating light in accordance with an image signal between two transparent substrates. The R light modulated by the spatial light modulator for R light 68R is incident on a cross dichroic prism 69, which is a color combining system.

The G light and the B light that have passed through the first dichroic mirror 65 are incident on a second dichroic mirror 70. The second dichroic mirror 70 reflects the G light and transmits the B light. The G light incident on the second dichroic mirror 70 is reflected off the second dichroic mirror 70, so that the optical path is folded, and the reflected light is incident on a field lens for G light 67G. The field lens for G light 67G parallelizes the G light from the second dichroic mirror 70, and the parallelized light is incident on a spatial light modulator for G light 68G. The spatial light modulator for G light 68G modulates the G light in accordance with an image signal. Specifically, the spatial light modulator for G light 68G is a transmissive liquid crystal display device. The G light modulated by the spatial light modulator for G light 68G is incident on a side of the cross dichroic prism 69 that is different from the side on which the R light is incident.

The B light that has passed through the second dichroic mirror 70 passes through a relay lens 71 and is then reflected off a reflection mirror 72, so that the optical path is folded. The B light from the reflection mirror 72 further passes through a relay lens 73, is reflected off a reflection mirror 74, so that the optical path is folded, and the reflected light is incident on a field lens for B light 67B. The optical path of the B light is longer than those of the R light and the G light. A relay system using the relay lenses 71 and 73 is therefore incorporated in the optical path of the B light in order to make the illumination magnification at the spatial light modulator for B light identical to those for the other color light.

The field lens for B light 67B parallelizes the B light from the reflection mirror 74, and the parallelized light is incident on a spatial light modulator for B light 68B. The spatial light modulator for B light 68B modulates the B light in accordance with an image signal. Specifically, the spatial light modulator for B light 68B is a transmissive liquid crystal display device. The B light modulated by the spatial light modulator for B light 68B is incident on a side of the cross dichroic prism 69 that is different from the sides on which the R light and the G light are incident.

The cross dichroic prism 69 has two dichroic films 75 and 76 substantially perpendicular to each other. The first dichroic film 75 reflects the R light and transmits the B and B light. The second dichroic film 76 reflects the B light and transmits the R and G light. The cross dichroic prism 69 combines the R, G, and B light incident through different sides and outputs the combined light toward a projection lens 77. The projection lens 77 projects the light combined in the cross dichroic prism 69 toward a screen.

Using the light source apparatus 10 described above allows the projector 60 to be thin and efficiently supply light to illuminated surfaces of the color spatial light modulators 68R, 68G, and 68G. The thus configured projector 60 is advantageously thin and capable of efficiently displaying a bright image. The thin projector 60 excels in mobility and installability. Any of the light source apparatus of the above embodiments may be used in the projector 60.

The projector 60 according to an embodiment of the invention does not necessarily use a transmissive liquid crystal display device as a spatial light modulator. Alternative examples of the spatial light modulator may include a reflective liquid crystal display device (Liquid Crystal On Silicon: LCOS), a DMD (Digital Micromirror Device), and a GLV (Grating Light Valve). The projector 60 does not necessarily include a spatial light modulator for each color light beam. The projector 60 may include one spatial light modulator that modulates two, three or more color light beams. The projector 60 does not necessarily use a spatial light modulator. The projector 60 may be a slide projector using slides carrying image information. The projector 60 may be what is called a rear projector, which supplies light onto one side of a screen and presents an image to the viewer who observes the light that exits through the other side of the screen. The light source apparatus according to an embodiment of the invention is not necessarily used in the projector 60. The light source apparatus may be applied to, for example, flashlights or other illuminators and headlights for automobiles.

As described above, the reflector according to an embodiment of the invention is useful when used in a light source apparatus of a projector.

The entire disclosure of Japanese Patent Application Nos. 2008-18650, filed Jan. 30, 2008 and 2008-283111, filed Nov. 4, 2008 are expressly incorporated by reference herein.

What is claimed is:

1. A reflector used in combination with a light emitting portion that emits light and disposed around a central axis on which the light emitting portion is disposed, the reflector comprising:
    a curved reflection section having the substantially same shape as that of a surface of revolution around the central axis, the curved reflection section reflecting light from the light emitting portion; and
    a flat deflection section formed on a substantially flat surface, the substantially flat surface being disposed closer to the central axis than the curved reflection section, the flat deflection section deflecting the light from the light emitting portion directly toward an opening on an opposite side of the light emitting portion;
    wherein the flat deflection section has a plurality of structural members formed on the flat surface, and
    when an ellipse is defined with reference to first and second focal points and the light emitting portion is disposed at the first focal point, the plurality of structural members are substantially concentrically arranged around a position that corresponds to the second focal point.

2. The reflector according to claim 1,
    wherein the flat deflection section is comprised of a first flat deflection section and a second flat deflection section provided on the opposite side of the central axis to the first flat deflection section.

3. The reflector according to claim 1,
    wherein the plurality of structural members form a diffraction grating that diffracts and hence deflects the light from the light emitting portion.

4. The reflector according to claim 1,
    wherein each of the plurality of structural members has a reflection surface that reflects and hence deflects the light from the light emitting portion.

5. The reflector according to claim 4,
    wherein the plurality of structural members form a blazed structure having a saw-tooth cross section.

6. The reflector according to claim 5,
    wherein the reflection surface has a curved surface based on a curve expressed in the cross section.

7. The reflector according to claim 4,
    wherein the plurality of structural members form a Fresnel structure having the substantially same cross section as that of a Fresnel lens.

8. The reflector according to claim 4,
    wherein each of the plurality of structural members is curved in the flat surface.

9. The reflector according to claim 1,
    wherein the surface of revolution is a spheroidal surface obtained by rotating an ellipse around the central axis.

10. The reflector according to claim 1,
    wherein the surface of revolution is a paraboloidal surface obtained by rotating a parabola around the central axis.

11. A light source apparatus comprising:
    a light emitting portion that emits light; and
    the reflector according to claim 1.

12. A projector comprising:
    the light source apparatus according to claim 11; and
    a spatial light modulator that modulates light outputted from the light source apparatus in accordance with an image signal.

* * * * *